(12) United States Patent
Kitanaka (10) Patent No.: US 8,148,926 B2
(45) Date of Patent: Apr. 3, 2012

(54) PERMANENT MAGNET SYNCHRONIZATION MOTOR VECTOR CONTROL DEVICE

(75) Inventor: Hidetoshi Kitanaka, Tokyo (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 542 days.

(21) Appl. No.: 12/377,495

(22) PCT Filed: Sep. 26, 2006

(86) PCT No.: PCT/JP2006/319034
§ 371 (c)(1),
(2), (4) Date: Feb. 13, 2009

(87) PCT Pub. No.: WO2008/038338
PCT Pub. Date: Apr. 3, 2008

(65) Prior Publication Data
US 2010/0277111 A1  Nov. 4, 2010

(51) Int. Cl.
*H02P 21/00* (2006.01)
(52) U.S. Cl. ............... 318/400.02; 318/400.01; 318/700
(58) Field of Classification Search ............. 318/400.01, 318/400.02, 700
See application file for complete search history.

(56) References Cited

U.S. PATENT DOCUMENTS

| | | | | |
|---|---|---|---|---|
| 5,803,197 | A * | 9/1998 | Hara et al. | 180/248 |
| 7,176,598 | B2 * | 2/2007 | Mori et al. | 310/156.57 |
| 7,969,106 | B2 * | 6/2011 | Kitanaka | 318/400.02 |
| 2003/0173921 | A1 | 9/2003 | Nakazawa | |
| 2004/0036434 | A1 * | 2/2004 | Chen et al. | 318/432 |
| 2006/0284582 | A1 * | 12/2006 | Jeong et al. | 318/432 |
| 2007/0090713 | A1 * | 4/2007 | Arita et al. | 310/181 |
| 2007/0108937 | A1 * | 5/2007 | Mir | 318/807 |
| 2009/0322270 | A1 * | 12/2009 | Fujita | 318/400.38 |

FOREIGN PATENT DOCUMENTS

| | | |
|---|---|---|
| JP | 6-53673 U | 7/1994 |
| JP | 10-243700 A | 9/1998 |
| JP | 2001-161099 A | 6/2001 |
| JP | 2003-274699 A | 9/2003 |
| JP | 2004-40883 A | 2/2004 |
| JP | 2005-337583 A | 12/2005 |
| JP | 2006-25583 A | 1/2006 |
| JP | 2006-121855 A | 5/2006 |
| JP | 2006-141095 A | 6/2006 |

OTHER PUBLICATIONS

International Search Report (PCT/ISA/210) dated Nov. 29, 2006.

* cited by examiner

*Primary Examiner* — Walter Benson
*Assistant Examiner* — Kawing Chan
(74) *Attorney, Agent, or Firm* — Buchanan Ingersoll & Rooney PC (57) ABSTRACT

A vector control device for a permanent magnet synchronous motor drive by an inverter. The vector control device includes: a current command generation unit for generating a d-axis current command id* and q-axis current command iq* from a given torque command T*; and a current control unit operating so that the motor current coincides with the current command. The current command generation unit includes: d-axis basic current command id1* by using the torque command; a limiter unit for inputting the current command id1* and outputting a value limited to below zero as a second d-axis basic current command id2*; a d-axis current command compensation unit for outputting the current command id2* corrected in accordance with the d-axis current command compensation value dV as a d-axis current command id*; and a q-axis current command generation unit for generating a q-axis current command iq* from the d-axis current command id*.

9 Claims, 4 Drawing Sheets

PERMANENT MAGNET SYNCHRONIZATION MOTOR VECTOR CONTROL DEVICE

TECHNICAL FIELD

The present invention relates to a permanent magnet synchronous motor vector control device, and more particularly to a permanent magnet synchronous motor vector control device provided with a current command generation unit that can obtain by use of a simple mathematical expression a d-axis current command id* and a q-axis current command iq* capable of realizing maximum torque control.

BACKGROUND ART

The technology of vector-controlling a permanent magnet synchronous motor by use of an inverter is widely utilized in the industrial fields; by separately operating the amplitude and the phase of the output voltage of the inverter, the current vector in the motor is optimally operated so that the torque of the motor is instantaneously controlled at high speed. Because, compared with an induction motor, magnetic flux is ensured by means of a permanent magnet, no excitation current is required, and because no current flows in the rotor, no secondary copper loss is produced; therefore, a permanent magnet synchronous motor is known as a high-efficiency motor, and the application of a permanent magnet synchronous motor to an electric vehicle control device has been studied in recent years. It is known that, in a magnet-embedded permanent magnet synchronous motor (i.e., interior permanent magnet synchronous machine, and abbreviated as IPMSM, hereinafter), which has been attracting people's attention in recent years, among permanent magnet synchronous motors, torque thereof is efficiently obtained by utilizing reluctance torque, produced through a difference between rotor magnetic resistance values, in addition to torque produced by magnetic flux caused by a permanent magnet.

However, it is known that, in an IPMSM, there exist a great number of combinations of d-axis current and q-axis current for generating given torque. Furthermore, it is known that the characteristics of an IPMSM such as the amplitude of a current that flows in the IPMSM, the power factor, the iron loss, and the copper loss largely change depending on the respective amplitudes of the d-axis current and the q-axis current, i.e., selection of the current vector. Accordingly, in order to operate an IPMSM efficiently, it is required to select an appropriate current vector in accordance with the application and operate it. That is to say, in a permanent magnet synchronous motor vector control device, it is required to generate an appropriate current command for instantaneously controlling the vector of an electric current that flows in a motor so that the current vector satisfies desired conditions described below; therefore, it is important in terms of configuring a system how to configure a current command generation unit that generates a current command from a torque command.

Methods of selecting a current command include a method of making the efficiency of a motor maximum, a method of making the power factor of the motor to be "1", a method of making torque obtained with given interlink magnetic flux to be maximum, a method of making torque obtained with a certain electric motor current to be maximum, and the like; however, in terms of application to an electric vehicle control device, the method of making torque obtained with a given current to be maximum (referred to as "maximum torque control", hereinafter) is optimal because, by utilizing this method, the current rating of an inverter can be minimized while the high-efficiency operation of a motor can be performed, whereby the loss in the inverter can also be minimized.

As a related conventional technology, Patent Document 1 discloses a method in which the respective optimal values of a d-axis current id and a q-axis current iq corresponding to various kinds of torque values of a motor are preliminarily measured and mapped; during operation of the motor, the map is referred to, as may be necessary, in response to a torque command, and a d-axis current command id* and a q-axis current command iq* corresponding to the torque command are obtained; then, current control is performed in such a way that the electric currents correspond to the d-axis current command id* and the q-axis current command iq*.

[Patent Document 1] Japanese Patent Application Laid-Open Pub. No. 2006-121855

DISCLOSURE OF THE INVENTION

Problems to be Solved by the Invention

However, the method in which a map is referred to is not preferable, because, in order to create the map, there is required a working step in which electric currents are measured while a motor is operated with various kinds of torque values, and then optimal combinations of a d-axis current id and a q-axis current iq are decided, and thereby it takes considerable time and labor to create the map, and because mounting of the map in an actual vector control device cannot readily be carried out, for example, for the reason that the map becomes large in capacity and complicated, and a large memory capacity is required in order to store the map.

The present invention has been implemented in order to solve the foregoing problems; the objective thereof is to provide a permanent magnet synchronous motor vector control device including a current command generation unit that can obtain a d-axis current command id* and a q-axis current command iq* with which maximum torque control can be realized by use of a simple calculation expression, without utilizing any map, and that can readily be mounted in an actual vector control device.

Means for Solving the Problems

A permanent magnet synchronous motor vector control device according to the present invention separates an electric current in a permanent magnet synchronous motor, driven by an inverter that converts a DC voltage into an arbitrary-frequency AC voltage and outputs the AC voltage, into a d-axis current id and a q-axis current iq that are quantities on a d axis and a q axis, respectively, and rotate in synchronization with a rotation electric angle of the permanent magnet synchronous motor, and controls the d-axis current id and the q-axis current iq. The vector control device includes a current command generation unit that generates a d-axis current command id* and a q-axis current command iq* from a given torque command; and a current control unit that operates in such a way that the currents in the motor coincide with the respective current commands. The current command generation unit is provided with a d-axis basic current command generation unit that utilizes the torque command so as to generate a first d-axis basic current command id1*; a limiter unit that receives the first d-axis basic current command id1* and outputs a value limited to below zero, as a second d-axis basic current command id2*; a d-axis current command compensation unit that receives the second d-axis basic current command id2* and outputs as the d-axis current command id* a value obtained by correcting the second d-axis basic current command id2* in accordance with a d-axis current command compensation value dV outputted from the current control unit; and a q-axis current command generation unit that generates a q-axis current command iq* from the d-axis current command id*, and the current command generation unit generates the d-axis current command id* and the q-axis current command iq* capable of generating with minimum currents the torque corresponding to the torque command.

Advantages of the Invention

A permanent magnet synchronous motor vector control device according to the present invention makes it possible to realize the maximum torque control by use of a simple calculation expression, without utilizing any map, and to obtain in a high-speed region the d-axis current command id* and the q-axis current command iq* that enable the control in a weakened magnetic flux; therefore, there can be obtained a permanent magnet synchronous motor vector control device having a current command generation unit that can readily be mounted in an actual vector control device.

DESCRIPTION OF REFERENCE NUMERALS

1: CAPACITOR
2: INVERTER
3, 4, 5: CURRENT DETECTOR
6: MOTOR
7: RESOLVER
8: VOLTAGE DETECTOR
10: CURRENT COMMAND GENERATION UNIT
11: D-AXIS BASIC CURRENT COMMAND GENERATION UNIT
12: LIMITER UNIT
13: ABSOLUTE-VALUE CIRCUIT
14: ADDER (D-AXIS CURRENT COMMAND COMPENSATION UNIT)
15, 15A: Q-AXIS CURRENT COMMAND GENERATION UNIT
20: CURRENT CONTROL UNIT
100: VECTOR CONTROL DEVICE

Best Mode for Carrying Out the Invention

Embodiment 1

Figure 1:
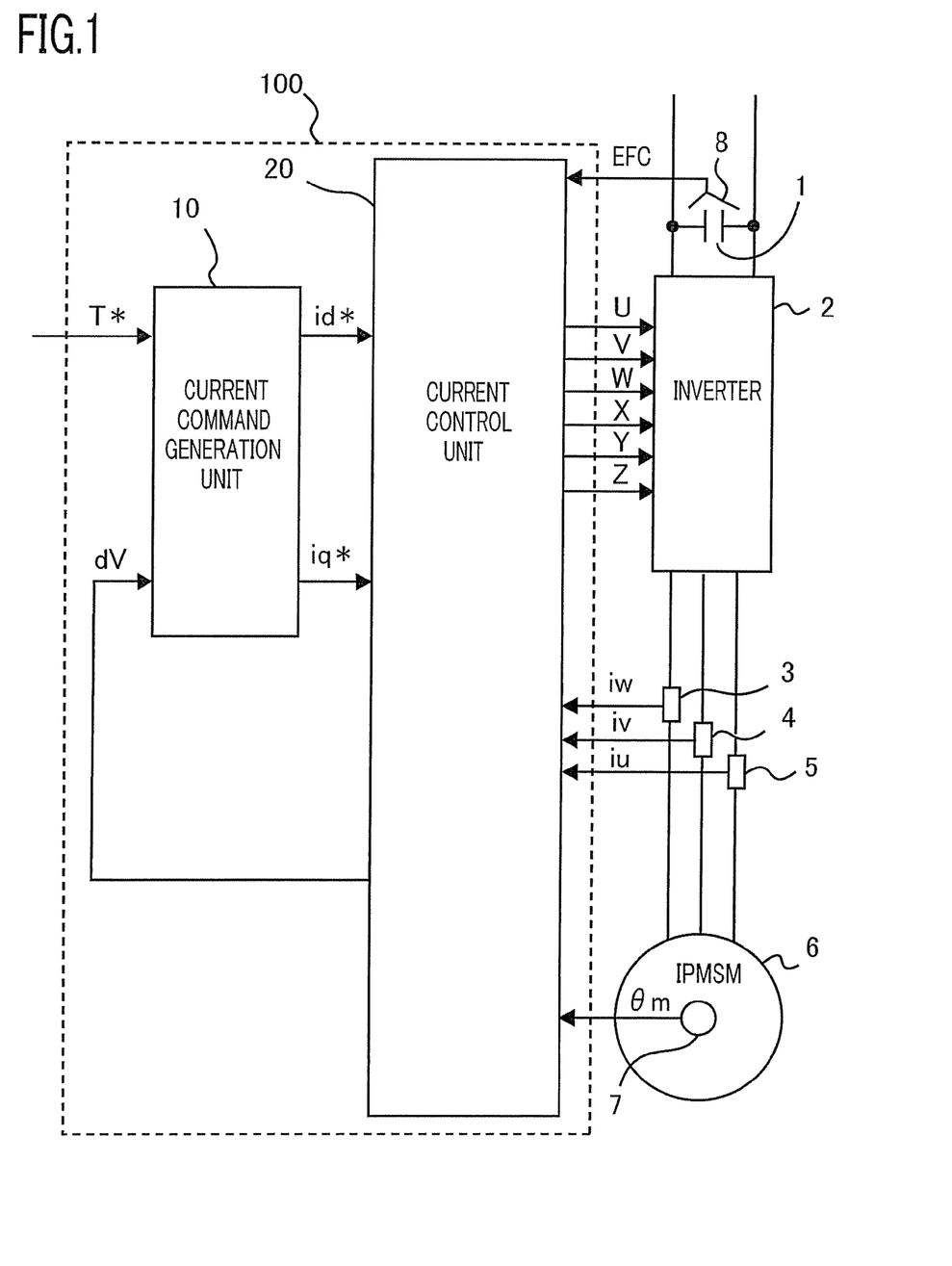
FIG. 1 is a schematic diagram illustrating the configuration of a permanent magnet synchronous motor vector control device according to Embodiment 1 of the present invention.

FIG. 1 is a diagram illustrating the configuration of a permanent magnet synchronous motor vector control device according to Embodiment 1 of the present invention. As illustrated in FIG. 1, the main circuit of the permanent magnet synchronous motor vector control device according to Embodiment 1 is configured with a capacitor 1 that serves as a DC power source, an inverter 2 that converts a DC voltage across the capacitor 1 into an AC voltage of an arbitrary frequency, and a permanent magnet synchronous motor (referred to simply as a motor, hereinafter) 6. In a circuit, there are arranged a voltage detector 8 that detects the voltage across the capacitor 1 and current detectors 3, 4, and 5 that detect currents iw, iv, and iu, respectively, in the output lines of the inverter 2; in the motor 6, there is disposed a resolver 7 that detects rotor position information θm; the respective detection signals are inputted to a vector control device 100.

In addition, the resolver 7 may be replaced by an encoder, or a position signal obtained through the resolver 7 may be replaced by a position signal obtained in accordance with a sensor-less method in which the position signal is calculated based on a voltage and a current; in such cases, the resolver 7 is not required. In other words, the method for obtaining a position signal is not limited to the method in which the resolver 7 is utilized. Additionally, as far as the current detectors 3, 4, and 5 are concerned, when the current detectors are provided for at least two phases, the current for the remaining phase can be obtained through a calculation; thus the permanent magnet synchronous motor vector control device may be configured in such a way as described above. The output currents of the inverter 2 may be obtained through reproduction from the DC-side currents of the inverter 2.

Gate signals U, V, W, X, Y, and Z generated by the vector control device 100 are inputted to the inverter 2 so that switching elements incorporated in the inverter 2 are PWM-controlled. As the inverter 2, a voltage source PWM inverter is preferably utilized; because the configuration thereof is publicly known, detailed explanation therefor will be omitted. A torque command T* is inputted from an unillustrated higher-hierarchy control device to the vector control device 100; the vector control device 100 controls the inverter 2 in such away that the torque generated by the motor 6 coincides with the torque command T*.

Next, the configuration of the vector control device 100 will be explained. The vector control device 100 is configured with a current command generation unit 10 and a current control unit 20.

The current command generation unit 10, which is a main part of the present invention, has a function of receiving the torque command T* and a d-axis current command compensation amount dV and generating a d-axis current command id* and a q-axis current command iq*. The d-axis current command compensation amount dV is an amount for correcting the d-axis current command id* so as to operate the motor 6 in a weakened magnetic flux so that, in a high-speed region, the induced voltage of the motor 6 does not exceed the outputtable maximum voltage of the inverter 2. As an example of calculation method for the d-axis current command compensation amount dV, there exists, for example, a publicly known technology in which, in the case where the voltage command to the motor 6 exceeds a given setting value, the d-axis current command compensation amount dV (becomes below zero) is generated in accordance with the excess amount; however, because the specific configuration thereof is no object herein, explanation therefor will be omitted. In addition, because the current command generation unit 10 is the main part of the present invention, explanation therefor will be made later.

The current control unit 20 receives the DC voltage EFC for the inverter 2 and the positional information θm for the motor 6 and converts the electric motor currents iu, iv, and iw on the three-phase static axes detected at the output-side of the inverter 2 into a d-axis current id and q-axis current iq, which are electric currents converted into amounts on the dq coordinates that rotate in synchronization with the rotation electric angle of the motor. Additionally, the current control unit 20 has a function of deciding on/off-switching of the gate signals U, V, W, X, Y, and Z inputted to the inverter 2 in such a way that the d-axis current id and the q-axis current iq coincide with the d-axis current command id* and the q-axis current command iq*, respectively, generated by the current command generation unit 10. In addition, a great number of publicly known technologies can be applied to the configuration of the current control unit 20; therefore, explanation therefor will be omitted.

A basic principle, which is required to understand the configuration of the current command generation unit 10 that is the main part of the present invention, will be explained below.

The condition (referred to as a minimum current condition, hereinafter) for the d-axis current id and the q-axis current iq for realizing maximum torque control in which maximum torque is obtained with a given electric current is given by the equation (1) below, which is already publicly known.

$$i_d = \frac{\phi_a}{2(L_q - L_d)} - \sqrt{\frac{\phi_a^2}{4(L_q - L_d)^2} + i_q^2} \quad (1)$$

where $L_d$ denotes a d-axis inductance (H); $L_q$, a q-axis inductance (H); $\phi_a$, permanent magnetic flux (Wb); $i_d$, a d-axis current (A); and $i_q$, a q-axis current (A).

In the case where given torque T is generated, by deciding the d-axis current id and the q-axis current iq in such a way as to satisfy the equation (1), the magnitude of the current vector formed of id and iq can be minimized. In other words, the amplitude of the current in the motor 6 can be minimized.

Meanwhile, the torque T generated by the motor 6 is given by the equation (2) below.

$$T = P_n\{\phi_a i_q + (L_d - L_q) i_d i_q\} \quad (2)$$

where Pn denotes the number of pole pairs in the motor 6.

By rearranging the equation for the q-axis current iq, the equation (3) below is yielded.

$$i_q = \frac{T}{P_n\{\phi_a + (L_d - L_q) i_d\}} \quad (3)$$

By solving the simultaneous equations consisting of the equation (1) and the equation (3) so as to obtain id and iq, there can be obtained the combination, of the d-axis current id and the q-axis current iq, that can generate given torque T with minimum currents.

Here, it is theoretically possible that, by, in the equations (1) and (3), reading the torque T as the torque command T*, the d-axis current id as the d-axis current command id*, and the q-axis current iq as the q-axis current command iq* and solving the simultaneous equations consisting of the equation (1) and the equation (3) for id* and iq*, there are obtained the d-axis current command id* and the q-axis current command iq* capable of generating with a minimum electric current the torque T that coincides with the torque command T*.

Figure 2:
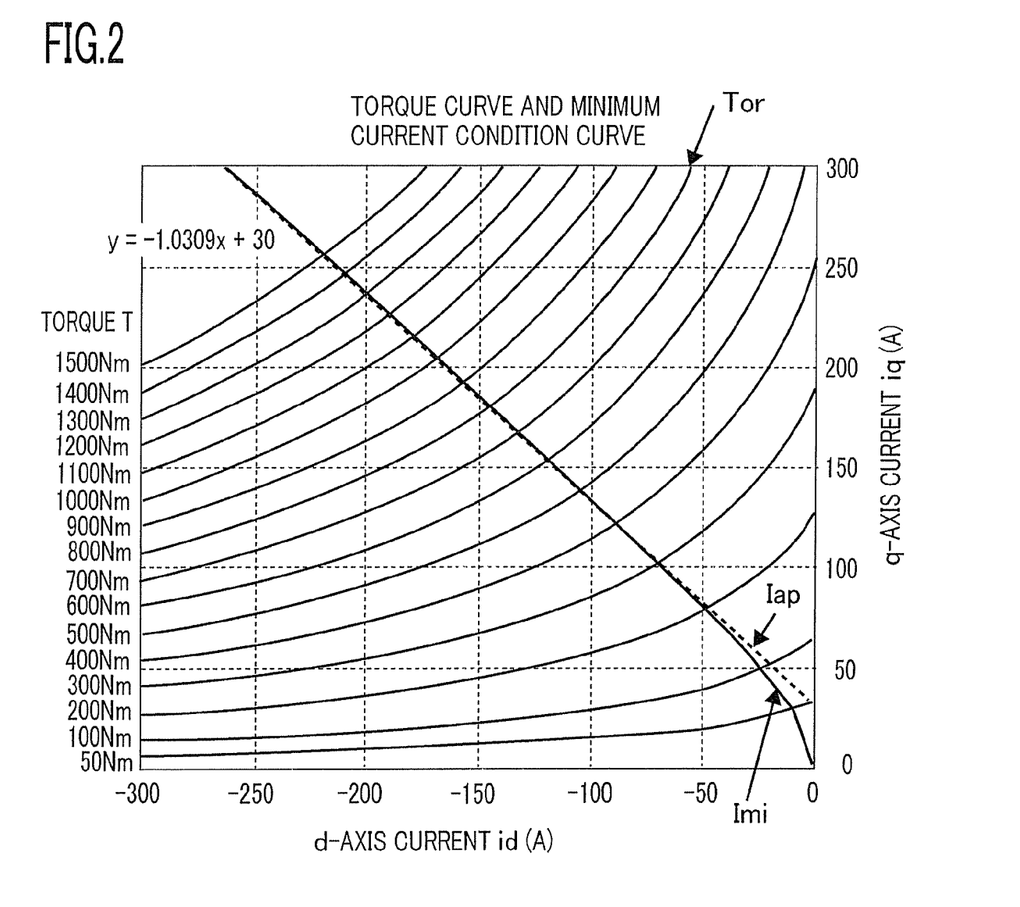
FIG. 2 is a graph representing the relationship between the torque curve and the curve indicating the minimum current condition, according to Embodiment 1 of the present invention.

FIG. 2 is a graph representing the relationship between the torque curve and the curve indicating the minimum current condition, according to Embodiment 1 of the present invention. The relationship between the torque curve and the curve indicating the minimum current condition represents the relationships in the equations (1) and (3) with the d-axis current id as the abscissa and the q-axis current iq as the ordinate. Each of the curves from the top right to the bottom left is a torque curve rendered by substituting power-running torque T (=50 Nm to 1500 Nm) for the torque T in the equation (3). The curve Imi from the top left to the bottom right is a curve indicating the minimum current condition represented by the equation (1); the curve Imi represents the combination of the d-axis current id and the q-axis current iq capable of generating given torque T with minimum currents.

The d-axis current id and the q-axis current iq capable of generating given torque T with minimum currents can be obtained by calculating the intersection point of the curve Imi indicating the equation (1) with the curve Tor indicating the equation (3) in FIG. 2. In FIG. 2, for Pn, Ld, Lq, and $\phi$a in the equations (1) and (3), there are set constants that are decided by imagining an electric vehicle driving motor whose output power is approximately 300 KW.

In addition, the torque curve and a curve indicating the minimum current condition in the case of a regenerative period are located in the unrepresented third quadrant in FIG. 2 and correspond to the respective curves rendered symmetrically with the curves in the case of a power running period, represented in FIG. 2, with respect to the abscissa. Accordingly, for that reason, the curves in the case of a regenerative period can also be presumed from the curves in the case of a power running period represented in FIG. 2. Specifically, as can be seen from FIG. 2, in the case where the power-running torque of 1300 Nm as the torque T is generated, the minimum current condition is the combination of id of approximately −200 A and iq of approximately 237 A; thus, in the case where the regenerative torque of −1300 Nm as the torque T is generated, the minimum current condition is the combination of id of approximately −200 A and iq of approximately −237 A. It goes without saying that the torque curve and a curve indicating the minimum current condition in the case of a regenerative period may be provided in addition to the curves in the case of a power running period so that the d-axis current id and the q-axis current iq that satisfy the minimum current condition are obtained.

Meanwhile, in order to calculate the intersection point of the curve Imi represented by the equation (1) with the curve Tor represented by the equation (3), it is required to solve the simultaneous equations, consisting of the equation (1) and the equation (3), for id and iq; however, because the simultaneous equations result in a biquadratic equation, it is difficult to obtain solutions, whereby mounting in an actual vector control device is difficult. Accordingly, in many conventional technologies, as described above, the d-axis current id and the q-axis current iq that can generate given torque T with minimum currents are obtained by use of a map.

In contrast, the present invention is to calculate the d-axis current id and the q-axis current iq that can generate the torque T with minimum currents, in accordance with a simple calculation expression and without utilizing any map. The foregoing method will be described in detail below.

It can be seen that, although being a quadratic curve, the curve Imi, in FIG. 2, indicating the minimum current condition is almost a straight line except for a region (id>−50 A, iq<75 A) where the d-axis current id and the q-axis current iq are small. Accordingly, in FIG. 2, there is represented by a broken line an approximate straight line Iap obtained by applying a linear approximation to the curve indicating the minimum current condition over a range except for a region (id>−50 A, iq<75 A) where the d-axis current id and the q-axis current iq are small. It can be seen from FIG. 2 that the approximate straight line Iap is located approximately on the curve indicating the minimum current condition.

In the application of controlling an electric vehicle, which is the subject of the present invention, the case where the motor 6 is operated in a region in which the d-axis current id and the q-axis current iq are small is limited, for example, to a constant-speed operation in which the motor 6 is operated with minute torque in order to maintain the speed of the electric vehicle; therefore, the frequency of the foregoing case out of the whole operation time is very low. Therefore, even in the case where a linear approximation is applied to the curve indicating the minimum current condition, in most cases, the motor is operated under the minimum current condition; thus, there exists no practical problem.

Let the approximate straight line for the curve, in FIG. 2, indicating the minimum current condition be given by the equation (4) below.

$$i_q = a i_d + b \qquad (4)$$

In the example in FIG. 2, the gradient a of the straight line is −1.0309, and the intercept b is 30.0. In the case where the approximate straight line for the equation (4) is utilized, the d-axis current id and the q-axis current iq capable of generating given torque T with minimum currents can be obtained by calculating the intersection point of the curve lap indicating the minimum current condition with the curve Tor; the d-axis current id and the q-axis current iq can be obtained by solving the simultaneous equations consisting of the equation (3) and the equation (4). The simultaneous equations result in a quadratic equation that can readily be solved. By organizing the equations (3) and (4), the equations (5) below can be obtained.

$$\{a P_n (L_d - L_q)\} i_d^2 + \{(a P_n \phi_a) + b P_n (L_d - L_q)\} i_d + b P_n \phi_a - T = 0 \qquad (5)$$

Based on the equation (5), the d-axis current id is given by the equation (6) below.

$$i_d = \frac{-\{(a P_n \phi_a) + b P_n (L_d - L_q)\} - \sqrt{\{(a P_n \phi_a) + b P_n (L_d - L_q)\}^2 - 4\{a P_n (L_d - L_q)\}(b P_n \phi_a - T)}}{2\{a P_n (L_d - L_q)\}} \qquad (6)$$

From the equation (6), the d-axis current id capable of generating given torque T with a minimum current, i.e., the d-axis current id that realizes the maximum torque control can be obtained. By substituting id given by the equation (6) for id in the equation (3), the q-axis current iq is obtained.

In addition, a and b in the equation (6) may preliminarily be obtained, as represented in FIG. 2, from the approximate straight line for the curve indicating the minimum current condition represented in the equation (1).

What has been described heretofore is the explanation for the principle of a method of obtaining the current vector capable of realizing the maximum torque control, i.e., the combination of the d-axis current id and the q-axis current iq.

Next, the configuration of a specific current command generation unit 10, which is preferable for the vector control of a permanent magnet synchronous motor, will be explained.

Figure 3:
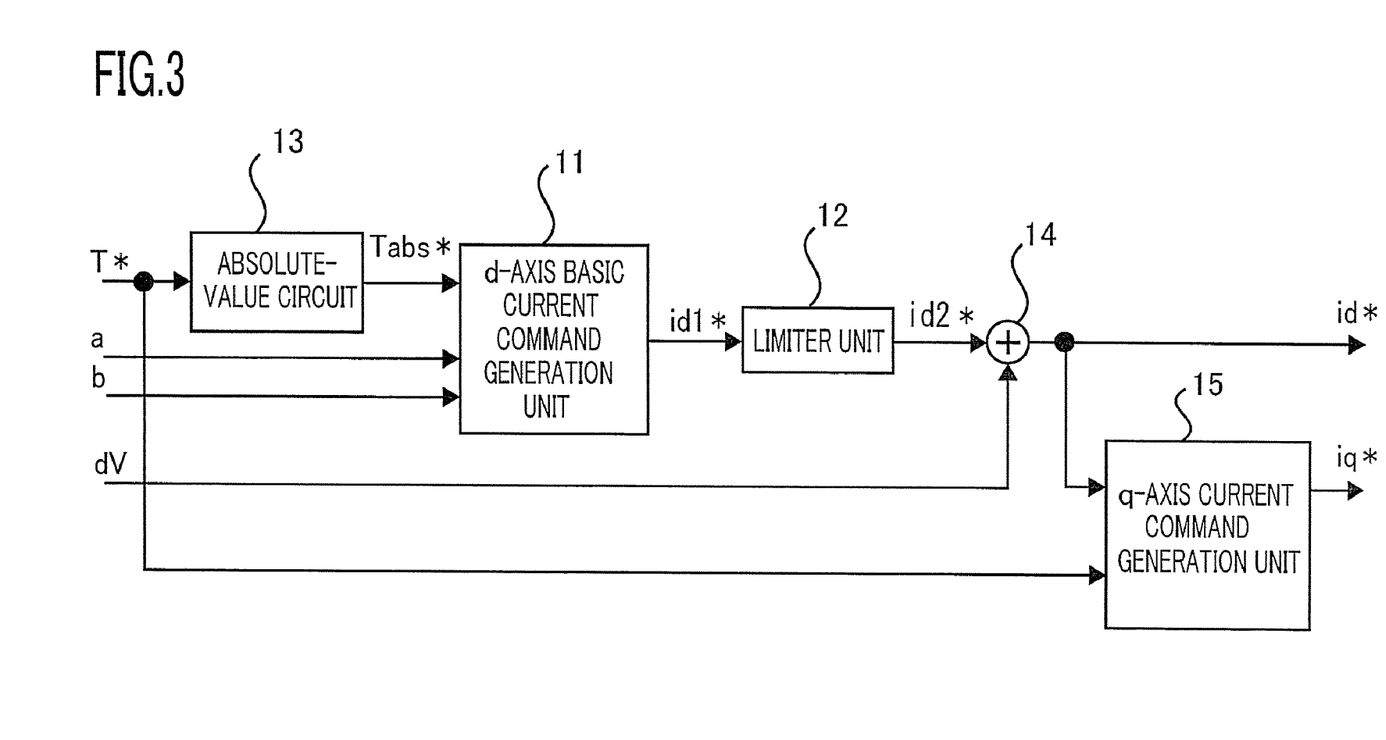
FIG. 3 is a block diagram illustrating the configuration of a current command generation unit according to Embodiment 1 of the present invention.

FIG. 3 is a diagram illustrating the configuration of a current command generation unit 10 according to Embodiment 1 of the present invention. As illustrated in FIG. 3, from a torque command absolute value Tabs* obtained by passing the torque command T* through an absolute-value circuit 13 and the gradient a and the intercept b of the approximate straight line indicating the minimum current condition represented by the equation (4), a d-axis basic current command generation unit 11 calculates a first d-axis basic current command id1*, based on the equation (7) below. The equation (7) is obtained by replacing the d-axis current id and the torque T in the equation (6) by the first d-axis basic current command id1* and the torque command absolute value Tabs*, respectively.

$$i_{d1}^* = \frac{-\{(a P_n \phi_a) + b P_n (L_d - L_q)\} - \sqrt{\{(a P_n \phi_a) + b P_n (L_d - L_q)\}^2 - 4\{a P_n (L_d - L_q)\}(b P_n \phi_a - Tabs^*)}}{2\{a P_n (L_d - L_q)\}} \qquad (7)$$

The first d-axis basic current command id1* calculated in accordance with the equation (7) is inputted to a limiter unit 12; in the case where id1* is positive, a second d-axis basic current command id2*, which is the output of the limiter unit 12, becomes "0"; in the case where id1* is negative, id2*, which is the output of the limiter unit 12, becomes equal to id1*. In other words, the limiter unit 12 has a function of limiting id2* not to become larger than zero.

As described above, by setting the upper limit value of the second d-axis basic current command id2* to zero, it can be prevented that, particularly in a region where the torque command T* is small (approximately 50 Nm or smaller), the intersection point of the torque curve with the approximate straight line indicating the minimum current condition occurs in the first quadrant (unrepresented), whereby there are calculated the d-axis current command id* and the q-axis current command iq* that are far away from the minimum current condition.

From another point of view, in a region where the torque command T* is small, automatic transit to the control in which id is fixed to zero, which is a publicly known technology, can be performed. In addition, by utilizing in the equation (7) the torque command absolute value Tabs*, it is made possible to obtain the first d-axis basic current command id1* by use of a single equation (7) both in the case where the power-running torque is outputted and in the case where the regenerative torque is outputted; therefore, the calculation can be simplified.

Next, the d-axis current command id* is obtained by adding the second d-axis current command id2* and the d-axis current command compensation amount dV in an adder 14 that serves as a d-axis current command compensation unit. The d-axis current command compensation amount dV is a value below zero, which varies depending on the operation condition of the motor 6.

As described above, in the case where the rotation speed of the motor is medium or low and the voltage for the motor 6 is the same as or lower than the maximum outputtable voltage of the inverter 2, the d-axis current command compensation amount dV becomes zero, whereby the d-axis current command id* that satisfies the minimum current condition can be obtained; in the case where, in a high-speed rotation region, the voltage for the motor 6 exceeds the maximum outputtable voltage of the inverter 2, it is made possible to decrease the d-axis current command id* in accordance with the d-axis current command compensation amount dV, whereby the motor 6 can be operated in a weakened magnetic flux.

Lastly, in a q-axis current command generation unit 15, by substituting the d-axis current command id* and the torque command T* for the equation (8) below, the q-axis current command iq* is obtained. The equation (8) is obtained by replacing the d-axis current id, the q-axis current iq, and the torque T in the equation (3) by the d-axis current command id*, the q-axis current command iq*, and the torque command T*, respectively.

$$i_q^* = \frac{T^*}{P_n\{\phi_a + (L_d - L_q)i_d^*\}} \tag{8}$$

As described above, the permanent magnet synchronous motor vector control device according to Embodiment 1 of the present invention makes it possible to realize the maximum torque control by use of a simple calculation expression, without utilizing any map, and to obtain in a high-speed region the d-axis current command id* and the q-axis current command iq* that enable the control in a weakened magnetic flux. The control is performed by the current control unit 20 in such a way that the respective currents in the motor 6 coincide with the d-axis current command id* and the q-axis current command iq* so that there can be obtained a permanent magnet synchronous motor vector control device capable of performing the maximum torque control of the motor 6.

The foregoing motor constants Ld, Lq, and φa, and the gradient a and the intercept b of the approximate straight line, which are utilized in the respective calculation expressions in the current command generation unit 10 may be changed at an arbitrary timing. For example, it is conceivable that the foregoing motor constants Ld, Lq, and φa, the gradient a, and the intercept b are changed in accordance with the speed of the motor 6, the magnitude of the torque, the amplitude of the current, and the driving condition such as a power running period or a regenerative period, or that the foregoing motor constants Ld, Lq, and φa, the gradient a, and the intercept b are changed and adjusted in accordance with the torque command T*, the d-axis current command id*, the q-axis current command iq*, or the d-axis current id and the q-axis current iq which are detection values. In such a manner as described above, even in the region (id>−50 A, iq<75 A), in FIG. 2, where the d-axis current id and the q-axis current iq are small, a more accurate minimum current condition can be calculated; therefore, a more ideal operating point can be obtained.

In terms of ensuring the stability of the control system, it is desirable that, in the case where the motor constants Ld, Lq, and φa, and the gradient a and the intercept b of the approximate straight line are changed and adjusted, the speed of the motor 6, the magnitude of the torque, the amplitude of the current, the torque command T*, and the d-axis current command id* and the q-axis current command iq*, or the d-axis current id and the q-axis current iq are referred to not directly but after being processed through a delay element such as a lowpass filter or a first-order delay circuit. In particular, the values of the motor constants Ld and Lq may change due to the effect of magnetic saturation; therefore, it is desirable to correct the values, as may be necessary.

Embodiment 2

Figure 4:
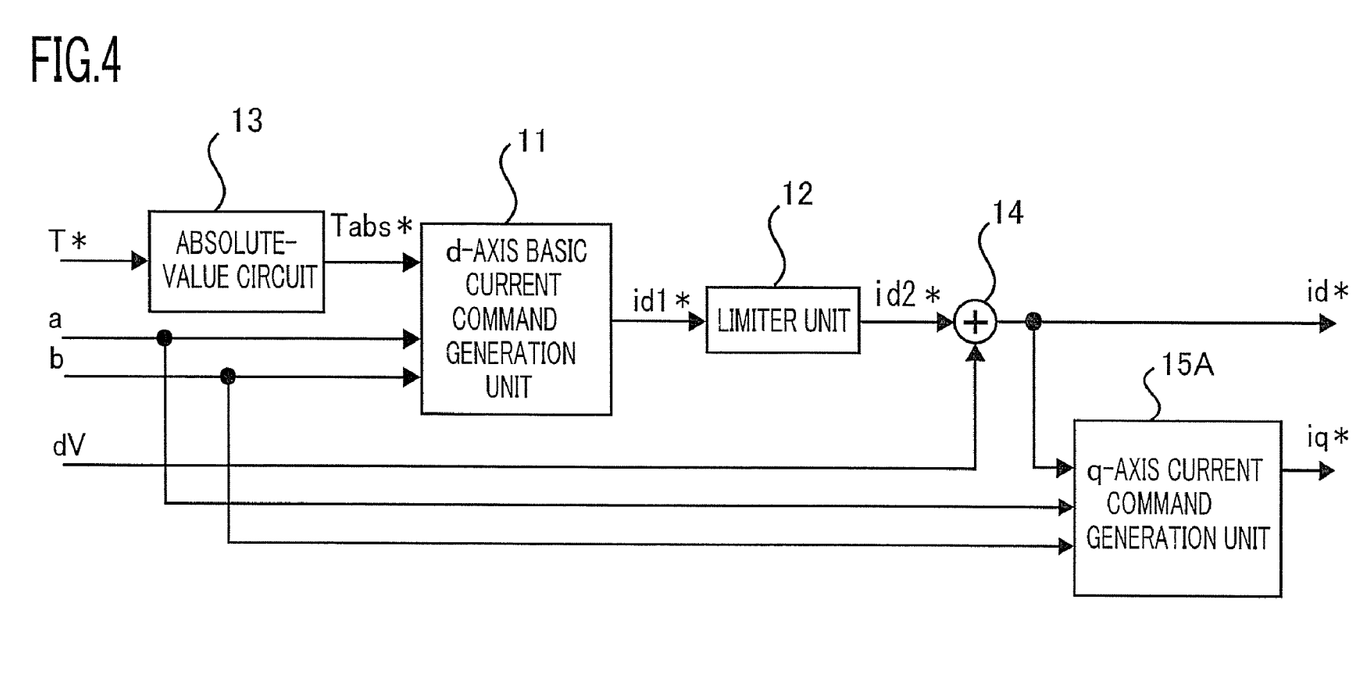
FIG. 4 is a block diagram illustrating the configuration of a current command generation unit according to Embodiment 2 of the present invention.

FIG. 4 is a diagram illustrating the configuration of a current command generation unit 10 in a permanent magnet synchronous motor vector control device according to Embodiment 2 of the present invention. Here, only constituent elements that differ from those of Embodiment 1 illustrated in FIG. 3 will be explained, and explanations for similar constituent elements will be omitted. As illustrated in FIG. 4, in a current command generation unit 10 according to Embodiment 2, the q-axis current command generation unit 15 is replaced by a q-axis current command generation unit 15A.

In the q-axis current command generation unit 15A, by substituting the d-axis current command id*, and the gradient a and the intercept b of the approximate straight line for the equation (9) below, the q-axis current command iq* is obtained. The equation (9) is obtained by replacing the d-axis current id and the q-axis current iq in the equation (4) by the d-axis current command id* and the q-axis current command iq*, respectively.

$$i_q^* = ai_d^* + b \tag{9}$$

In Embodiment 2, because the q-axis current command iq* is calculated in accordance with the equation (9), the configuration of the expression is simpler than that of Embodiment 1 in which iq* is calculated in accordance with the equation (8); therefore, the amount of calculation can be suppressed, whereby an inexpensive microprocessor can be utilized.

The configurations described in the foregoing embodiments are examples of the aspects of the present invention and can be combined with other publicly known technologies; it goes without saying that various features of the present invention can be configured, by modifying, for example, partially omitting the foregoing embodiments, without departing from the scope and spirit of the present invention.

Moreover, in the foregoing embodiments, although the explanation for the present invention has been implemented in consideration of its application to an electric vehicle, the application field of the present invention is not limited thereto; it goes without saying that the present invention can be applied to various related fields such as the fields of electric automobiles, elevators, and electric power systems.

The invention claimed is:

1. A permanent magnet synchronization motor vector control device, applied to an electric vehicle control device, separating an electric current in a permanent magnet synchronization motor, driven by an inverter that converts a DC voltage into an arbitrary-frequency AC voltage and outputs the AC voltage, into a d-axis current id and a q-axis current iq that are quantities on a d axis and a q axis, respectively, and rotate in synchronization with a rotation electric angle of the permanent magnet synchronization motor, and controlling the d-axis current id and the q-axis current iq, the vector control device comprising:

a current command generation unit that generates a d-axis current command id* and a q-axis current command iq* from a given torque command; and a current control unit that operates in such a way that the currents in the motor coincide with the respective current commands, wherein the current command generation unit is provided with a d-axis basic current command generation unit that utilizes the torque command so as to generate a first d-axis basic current command id1*; a limiter unit that receives the first d-axis basic current command id1* and outputs a value obtained by limiting the first d-axis basic current command id1* to below zero, as a second d-axis basic current command id2*; a d-axis current command compensation unit that receives the second d-axis basic current command id2* and outputs as the d-axis current command id* a value obtained by correcting the second d-axis basic current command id2* in accordance with a d-axis current command compensation value dV outputted from the current control unit; and a q-axis current command generation unit that generates a q-axis current command iq* from the d-axis current command id*, and the current command generation unit generates the d-axis current command id* and the q-axis current command iq* capable of generating with minimum currents the torque corresponding to the torque command, wherein the d-axis basic current command generation unit generates the first d-axis basic current command id1*, by obtaining an intersection point of an equation (3) below indicating the relationship among the torque T, the d-axis current id, and the q-axis current iq of the motor with a linear equation (4) below that is obtained by applying a linear approximation to a curve indicating a condition under which the motor can generate a given torque with minimum currents, over a range of the curve being substantially straight line and excluding a region where a magnitude of the d-axis current id and a magnitude of the q-axis current iq are small, and that has a gradient and an intercept that represent the relationship between the d-axis current and the q-axis current, and wherein the first d-axis basic current command id1* is generated from a first equation (7) below:

$$i_q = \frac{T}{P_n\{\varphi_a = (L_d - L_q)i_d\}} \quad (3)$$

$$i_q = ai_d + b \quad (4)$$

$$i_{d1}^* = \frac{-\{(aP_n\varphi_a) + bP_n(L_d - L_q)\} - \sqrt{\{(aP_n\varphi_a) + bP_n(L_d - L_q)\}^2 - 4\{aP_n(L_d - L_q)\}(bP_n\varphi_a - Tabs^*)}}{2\{aP_n(L_d - L_q)\}} \quad (7)$$

where Tabs* denotes the absolute value of the torque command; $L_d$, a d-axis inductance (H); $L_q$, a q-axis inductance (H); $\phi_a$, permanent magnetic flux (Wb); Pn, the number of pole pairs of the motor; a, the gradient of the linear equation; and b, the intercept of the linear equation.

2. The permanent magnet synchronization motor vector control device according to claim 1, wherein any one of Ld, Lq, φa, a, and b in the first equation is changed at an arbitrary timing.

3. The permanent magnet synchronization motor vector control device according to claim 1, wherein any one of Ld, Lq, φa, a, and b in the first equation is changed in accordance with a signal including the d-axis current id and the q-axis current iq in the motor, the d-axis current command id*, the q-axis current command iq*, and the torque command T*.

4. The permanent magnet synchronization motor vector control device according to claim 1, wherein the q-axis current command iq* is generated by substituting the d-axis current command id* for a second equation below:

$$i_q^* = \frac{T^*}{P_n\{\phi_a + (L_d - L_q)i_d^*\}}$$

where T* denotes the torque command; $L_d$, a d-axis inductance (H); $L_q$, a q-axis inductance (H); φa, permanent magnetic flux (Wb); and Pn, the number of pole pairs of the motor.

5. The permanent magnet synchronization motor vector control device according to claim 4, wherein any one of Ld, Lq, and φa in the second equation is changed at an arbitrary timing.

6. The permanent magnet synchronization motor vector control device according to claim 4, wherein any one of Ld, Lq, and φa in the second equation is changed in accordance with a signal including the d-axis current id and the q-axis current iq in the motor, the d-axis current command id*, the q-axis current command iq*, and the torque command T*.

7. The permanent magnet synchronization motor vector control device according to claim 1, wherein the q-axis current command iq* is generated by substituting the d-axis current command id* for a third equation below:

$$i_q^* = ai_d^* + b$$

where a and b denote the gradient and the intercept, respectively, of the first equation.

8. The permanent magnet synchronization motor vector control device according to claim 7, wherein any one of a and b in the third equation is changed at an arbitrary timing.

9. The permanent magnet synchronization motor vector control device according to claim 7, wherein any one of a and b in the third equation is changed in accordance with a signal including the d-axis current id and the q-axis current iq in the motor, the d-axis current command id*, the q-axis current command iq*, and the torque command T*.

* * * * *